United States Patent [19]

Jonas

[11] Patent Number: 4,505,451
[45] Date of Patent: Mar. 19, 1985

[54] DIAPHRAGM VALVE

[75] Inventor: Rolf Jonas, Kiriat Bialik, Israel

[73] Assignee: Kim Production Limited, Haifa Bay, Israel

[21] Appl. No.: 382,727

[22] Filed: May 27, 1982

[30] Foreign Application Priority Data

Jul. 15, 1981 [IL] Israel .................................. 63319

[51] Int. Cl.$^3$ .............................................. F16K 7/16
[52] U.S. Cl. ................................... 251/285; 251/331
[58] Field of Search ............................. 251/331, 285

[56] References Cited

U.S. PATENT DOCUMENTS

| | | | |
|---|---|---|---|
| 2,540,371 | 2/1951 | Jacobsen | 251/331 X |
| 3,175,473 | 3/1965 | Boteler et al. | 251/331 X |
| 3,633,874 | 1/1972 | Veugelers | 251/331 X |
| 4,014,514 | 3/1977 | Priese et al. | 251/331 |

FOREIGN PATENT DOCUMENTS

| | | | |
|---|---|---|---|
| 157400 | 7/1978 | Netherlands | 251/285 |
| 1512088 | 10/1975 | United Kingdom . | |

*Primary Examiner*—Arnold Rosenthal
*Attorney, Agent, or Firm*—Schwartz, Jeffery, Schwaab, Mack, Blumenthal & Koch

[57] ABSTRACT

A rising-handwheel diaphragm valve is provided with means serving to protect the diaphragm (3) against damage by excess closing pressure. For this purpose the valve spindle (4) is provided with external screw thread (43) along its entire top portion, and the handwheel (6) is translationally movable along the spindle on a central screw-threaded bore (65). The spindle (4) is perforated near its top by a transverse bore (44), and the handwheel (6) has a raised hub (63) crossed by two transverse grooves (64), permitting the handwheel (6) to be fixed to the spindle (4) at the desired level by means of a horizontal pin (7) engaging both with the bore (44) and one of the grooves (64). The handwheel (6) is also provided with a downwardly extending collar (62) which contacts—at the desired lowermost position of the spindle—an annular planar surface (13) on the bonnet (1) of the valve casing, thus preventing undue pressure on the diaphragm (3).

5 Claims, 4 Drawing Figures

DIAPHRAGM VALVE

The invention relates to diaphragm valves having a translationally movable spindle, more particularly to a device serving to protect the diaphragm against rapid wear and tear, due to excessive mechanical pressure exerted by the closing force.

BACKGROUND AND OBJECTS

Diaphragm valves contain a diaphragm in the form of a sheet of rubber or other suitable elastomer which is generally clamped along its edges between two portions of the valve casing and is adapted to close the valve by being pressed onto a valve seat in the form of a weir separating the zones of different pressures. Pressure is applied on the diaphragm sheet by means of a handwheel and a spindle which is rotated by the operator until he encounters sufficient resistance against his turning motion. The pressure applied is obviously not controlled, since every person will apply a torque that appears sufficient to his own senses, and it is a common experience that the diaphragm is usually pressed onto the seat with more than sufficient force, with the aim to ensure absolute tightness of the valve. As a consequence, the diaphram is often compressed beyond its elastic limit which leads to damage to the sheet surface, requiring its replacement. Since this expresses itself in both waste of time and costs and, in addition, in making the line inoperative during the repair period, it is the object of the present invention to prevent the diaphragm from being unduly compressed, however sufficiently to ensure complete closure of the valve.

It is an additional object of the invention to make provision for adjustment of the pressure exacted in relation to the thickness of the diaphragm and for compensating for certain wear of its surface.

DESCRIPTION OF THE INVENTION

The valve, a so-called rising handwheel diaphragm valve, suitable for the diaphragm protecting device is, in a known manner, provided with a translationally movable spindle having its upper portion screw-threaded and being adapted to be rotated in a screw-threaded bore in the upper portion of the valve casing, while having its lower end rotatingly fastened to the upper side of the diaphragm by means of an interposed compressor body, which is thereby moved between an "open" and a "closed" position of the diaphragm.

For the sake of simplifying the following description of the invention it will be assumed that the valve is positioned with its spindle extending in vertical direction and with the handwheel attached to the top of the spindle.

The device serving to protect the diaphragm against excessive mechanical pressure is characterized by the fact that the handwheel is fastened to the spindle at a predetermined height and distance from the valve casing, and that it is provided with a downwardly extending collar adapted to contact a suitably shaped portion of the casing, thereby limiting the downward motion of the spindle. The position of the handwheel on the spindle is predetermined so as to cause the handwheel to contact the casing before the diaphragm is pressed onto its seat with excessive force.

In a preferred embodiment of the invention the entire top portion of the spindle is screw-threaded and perforated by a transverse hole near its upper end. The handwheel is movable along the spindle by means of a central screw-threaded bore cooperating with the spindle thread; it is provided with a downwardly extending collar and with at least one transverse groove in its upper surface, the groove extending centrally across the theaded bore and having a width of not less than the diameter of the hole in the spindle. The handwheel is fastened to the spindle in the desired correct position by means of a pin inserted into the hole in the spindle and the groove in the handwheel, while these are in proper alignment. The upper part, the bonnet, of the valve casing is provided with a planar portion serving as a stop for the lower edge of the hand-wheel collar, and the position of the hand wheel on the spindle is so predetermined that the collar contacts the casing before the diaphragm is pressed down on its seat beyond a permitted pressure. Whenever it is observed that the valve does not close tightly, the pin can be withdrawn and reinserted after the handwheel has been rotated on the spindle by at least one quarter revolution.

In order to permit a more accurate adjustment of the diaphragm pressure, the hand wheel is preferably provided with two grooves perpendicular to each other; as an alternative, three grooves may be provided, particularly in a large wheel.

The groove or grooves may extend across the entire diameter of the hand wheel, or they may be provided in a raised hub only, to which the wheelrim is connected by spokes in a known manner, the latter arrangement being suitable for large-size valves.

DESCRIPTION OF THE DRAWINGS

In the accompanying drawings which illustrate, by way of example, several embodiments of the invention.

DESCRIPTION OF THE PREFERRED EMBODIMENTS

Figure 1:
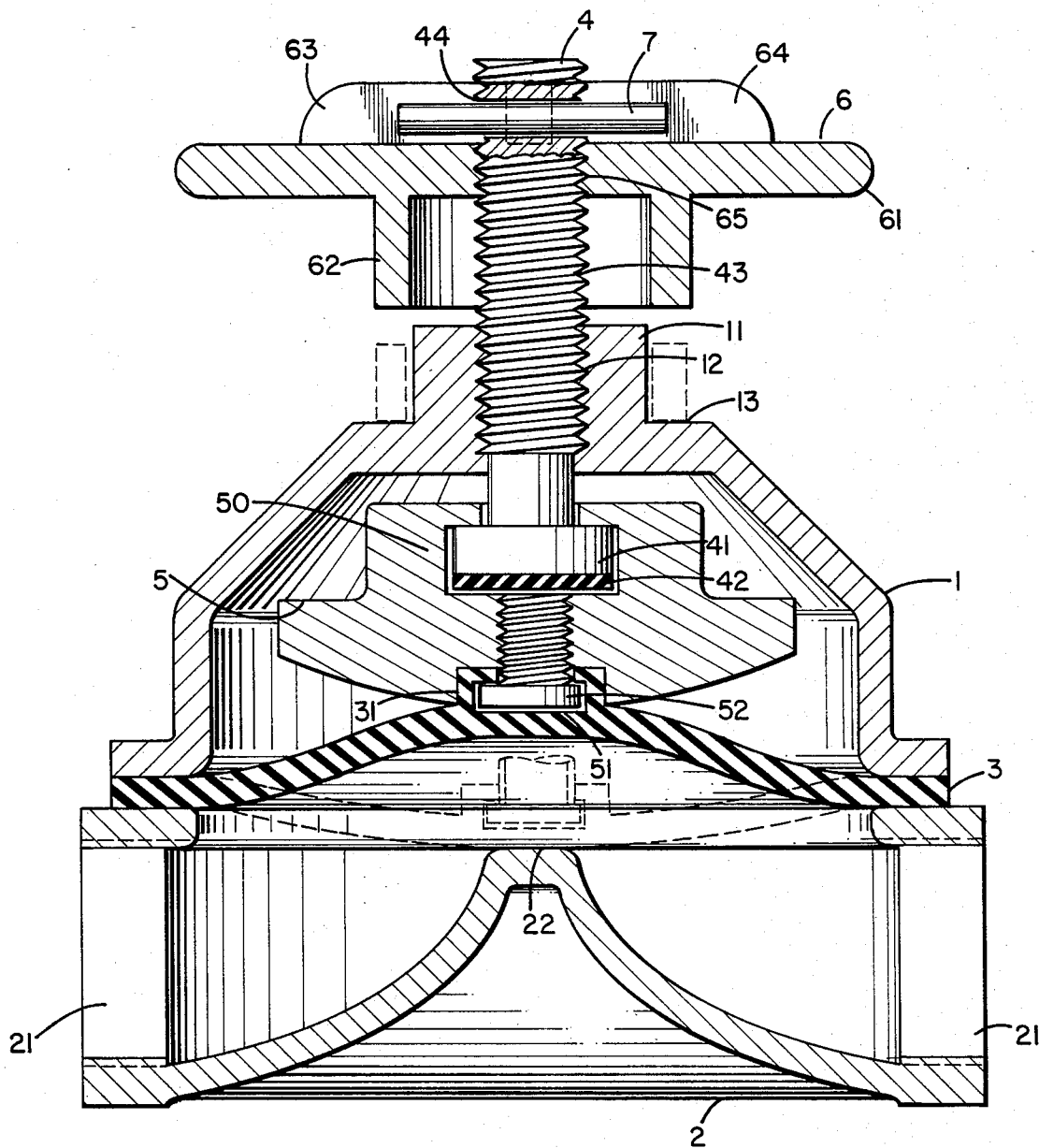
FIG. 1 is a vertical section through a diaphragm valve comprising the diaphragm-protecting device.
Figure 2:
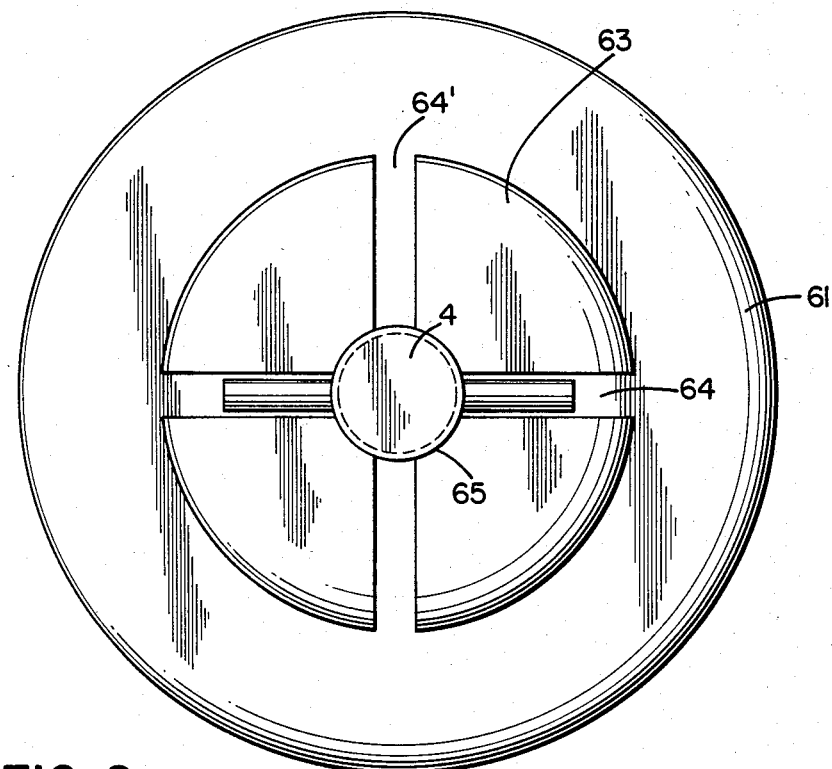
FIG. 2 is a plan view of the handwheel shown in FIG. 1.

Referring now to FIGS. 1 and 2 of the drawings, a diaphragm valve comprises, in a known manner, a horizontally split casing consisting of a body 2 and a bonnet 1, and a resilient diaphragm 3 clamped between flat surfaces of the two casing parts. The casing body contains a fluid inlet 21 and a fluid outlet 21', and a curved weir seat 22 extending across the central portion at right angles to the fluid flow and serving as a seat for the diaphragm, thus adapted to interrupt communication between inlet and outlet. The bonnet 1 contains an upstanding head-portion 11 which is centrally perforated by a threaded bore 12 and contains a threaded vertical spindle 4. The outside of the head portion is machined to form a flat annular portion 13 serving as limit stop for the downgoing handwheel, as will be described further on.

The bottom end of the spindle 4 is enlarged to form a disc 41 engaging with a corresponding cylindrical cavity 50 in the top portion of a compressor body 5, the underside of which is shaped so as to conform to the curvature of the weir seat 22 and which serves, in a known manner, to distribute the pressure exerted by the spindle on a larger area of the diaphragm surface. The compressor body 5 is connected to the diaphragm by means of a threaded bolt 51, threadedly fastened to its underside, the bottom end of this 51 being enlarged to form a disc 52 which engages with a locking portion 31 in the centre of the diaphragm; a washer 42 is inserted between the bottom portion of the spindle 4 and the compressor body 5, its object being to facilitate the rotation of the spindle in this body, the compressor body 5 being prevented from rotating in the casing by guides in the bonnet which are not visible in the drawing.

The novel feature of the valve lies in the fixation of the handwheel 6 to the spindle 4 at variable height above the casing; in the embodiment illustrated in FIGS. 1 and 2 the entire top portion of the spindle is provided with external screwthread 43, and a transverse hole 44 passes through the spindle 4 near its top end.

The handwheel 6 comprises an outer rim 61, a downwardly extending collar 62 and a raised hub 63, this hub being crossed by two deep grooves 64, 64'. The handwheel 6 is centrally perforated by a threaded bore 65 cooperating with the spindle thread 43 and is axially movable on the spindle 4. A pin 7 is inserted into the hole 44 and into the groove 64 in a position of the handwheel at a predetermined height of the collar 62 above the annular surface 13 on the bonnet.

The operation of this device is as follows: the spindle 4, the handwheel 6 and the diaphragm 3 are shown in full lines for the open position of the valve and in interrupted lines for the closed position. After manufacture and assembly the valve is closed by rotating the spindle 4 until the diaphragm is in contact with the valve seat 22, and no fluid passes through the valve; with the object of increasing the safety factor the spindle 4 is given another quarter turn, the pin 7 is now withdrawn and the handwheel 6 is rotated on the spindle thread in downward direction until its collar 62 contacts the annular surface 13. The valve is now ready for insertion into a fluid line. Should it be found, after a certain period of use, that the valve does not fully close the passage, the pin 7 is withdrawn, the handwheel 6 is rotated in upward direction by a quarter turn and the pin is inserted through the groove 64'. This permits an additional downward motion of the spindle with stronger pressure exerted on the diaphragm. In case this operation does not suffice to entirely close the fluid passage, an additional quarter turn may be necessary.

Figure 3:
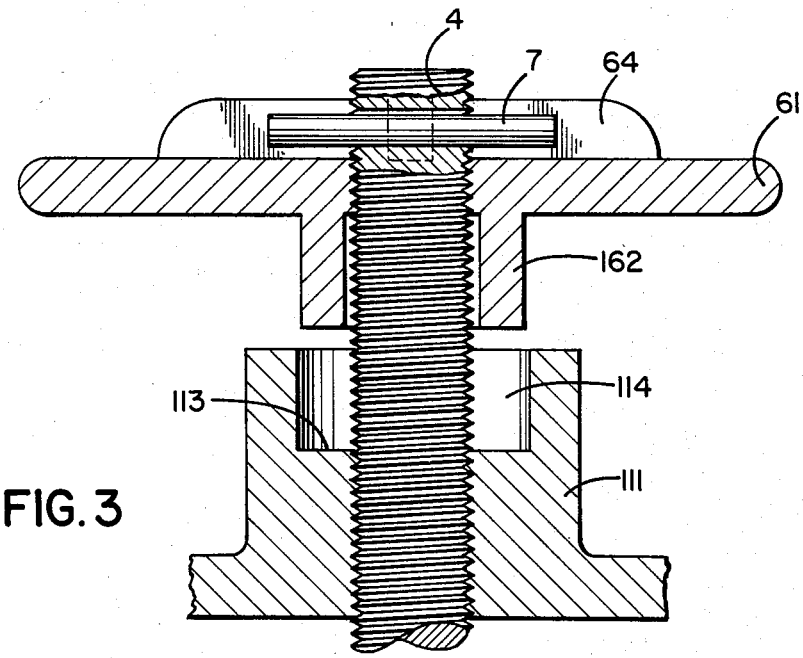
FIG. 3 is a section through the handwheel and the top portion of a valve-casing containing a modified device.

FIG. 3 illustrates the top portion of a valve similar to that illustrated in FIG. 1, however in this embodiment the head portion 111 of the bonnet 1 is machined to form a cylindrical recess 114, its bottom portion 113 serving as a limit stop for the collar 162 of the handwheel. It can be seen that the collar, in this case, is of smaller diameter than that shown in FIG. 1, but that the effect and the operation of the diaphragm protecting device is identical in both cases.

Figure 4:
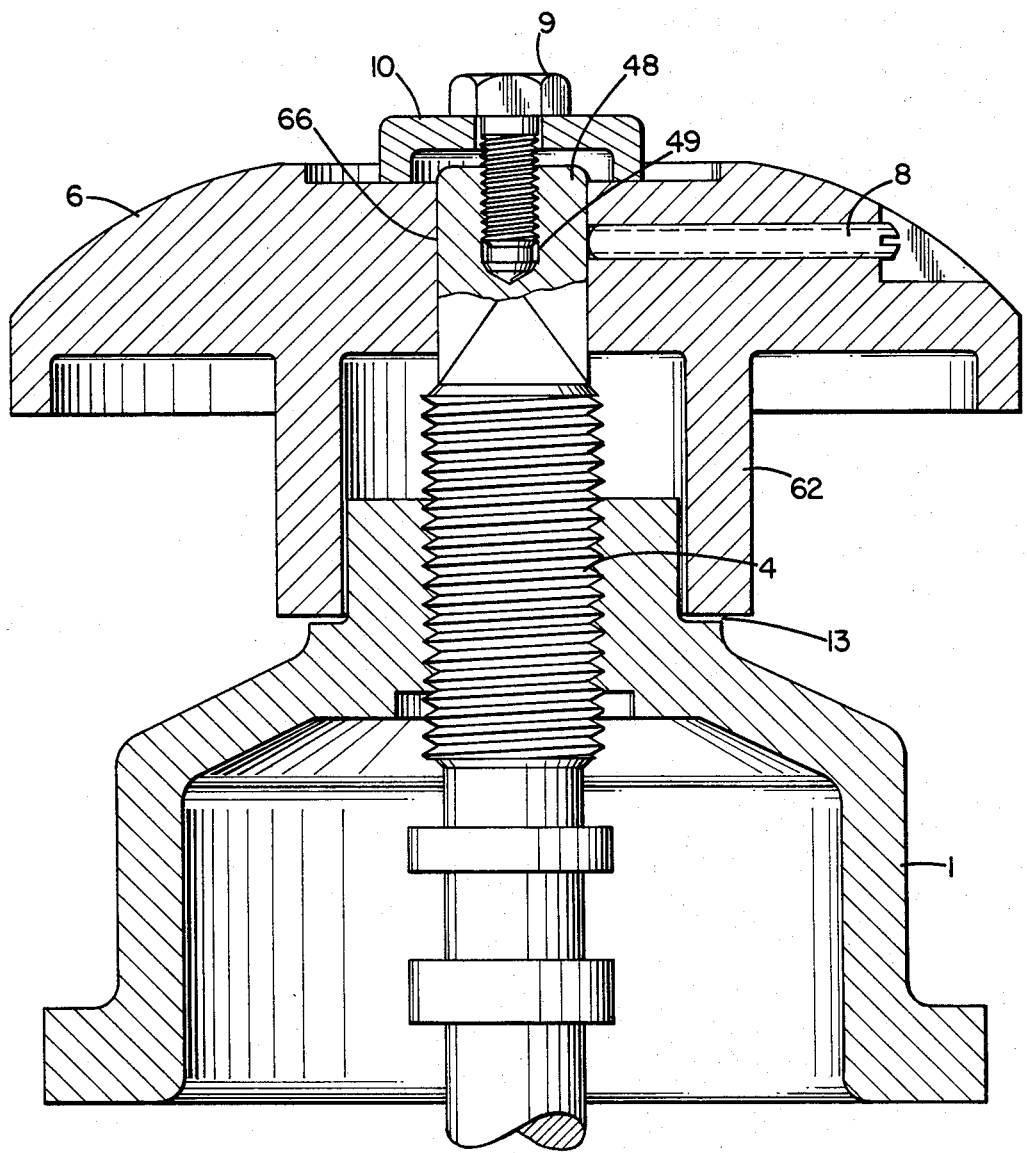
FIG. 4 is a vertical section through the top portion of a diaphragm valve, showing still another embodiment of the diaphragm-protecting device.

The embodiment of FIG. 4 shows a different method of fastening the handwheel to the spindle at the required height. Herein the spindle 4 is shaped to form a square head 48, the top of which is drilled in the shape of a threaded central bore 49. The handwheel 6 is centrally perforated by a square hole 66, slidingly movable on the square of the spindle and held at any height by a set screw 8 positioned in a horizontal bore of the hand wheel. The relative position of handwheel 6 and spindle 4 is adjusted by means of a machine screw 9 engaging with the bore 49 and adapted to urge the handwheel in downward direction by aid of a cup-shaped washer 10. The handwheel is provided, as in the aforedescribed embodiments, with a collar 62 contacting, in the "closed" position, the surface 13 of the bonnet 1.

The adjustment of the handwheel's position on the square head of the spindle is made by means of the screw 9, and the handwheel is then fixed in the required position by the set screw 8.

It will be understood that the device may be modified by a person skilled in the art, in accordance with the shape of the diaphragm valve and in accordance with different applications of the valve, without deviating from the spirit of the invention and the scope of the appended claims.

I claim:

1. In a diaphragm valve having a casing, and a reciprocating threaded spindle in said casing, a device for protecting the diaphragm against excessive mechanical pressure in the fully closed position of the valve, said device comprising means for adjustably connecting a handwheel to said spindle at a predetermined distance from said casing and means for limiting the movement of said handwheel in the direction of said casing, said handwheel having an internally threaded bore for engagement with said threaded spindle in such a manner as to be threadedly adjustable along said spindle, said limiting means comprising a collar integral with said handwheel and a planar surface on said casing, said spindle including at its upper end a transverse opening, and said handwheel including at least one transverse groove in the upper surface thereof traversing said threaded bore and being of a width not less than the diameter of said transverse opening, and pin means removably inserted into said transverse opening and in engagement with said transverse groove, whereby said pin means prevents relative rotation of said handwheel and said spindle when said pin means is in place, whereby when said valve is closed, said collar contacts said planar surface, thereby limiting further closing movement of said handwheel.

2. The diaphragm protecting device of claim 1 and wherein said handwheel includes two of said transverse grooves in the upper surface thereof, said grooves being substantially perpendiclar to each other.

3. The diaphragm protecting device of claim 2 and wherein said handwheel includes a raised hub portion containing said two transverse grooves.

4. The diaphragm protecting device of claim 1 and wherein said planar surface is annular and surrounds the head portion of said casing.

5. The diaphragm protecting device of claim 1 and wherein said planar surface is annular and forms the bottom of a cylindrical groove in the head portion of said casing surrounding the spindle.

* * * * *